350-382 SR
OR 3,391,972 75 R
WP
SEARCH ROOM

July 9, 1968 T. J. HARRIS ET AL 3,391,972

DIGITAL LIGHT DEFLECTOR HAVING EQUAL PATH LENGTHS
FOR ALL POSSIBLE PATHS

Filed Sept. 25, 1964 5 Sheets-Sheet 1

INVENTORS
THOMAS J. HARRIS
WERNER W. KULCKE
ERHARD MAX

BY Ralph C. Dustin

ATTORNEY

United States Patent Office 3,391,972

Patented July 9, 1968

3,391,972

DIGITAL LIGHT DEFLECTOR HAVING EQUAL PATH LENGTHS FOR ALL POSSIBLE PATHS

Thomas J. Harris and Werner W. Kulcke, Poughkeepsie, and Erhard Max, Wappingers Falls, N.Y., assignors to International Business Machines Corporation, Armonk, N.Y., a corporation of New York Filed Sept. 25, 1964, Ser. No. 399,285
10 Claims. (Cl. 350—150)

ABSTRACT OF THE DISCLOSURE

Light deflector apparatus is provided for interposition between a source of plane polarized light and a target for deflecting a beam from the source to a selected position in the target. Each stage of the deflector includes a polarization rotator for rotating the light beam into one of two mutually orthogonal planes and birefringent means for transmitting the beam along one of two paths dependent on the plane of its polarization. Each birefringent means includes two elements having particular orientations such that the optical path lengths of the beams in the two planes are substantially equal through each stage.

This invention relates to apparatus for deflecting a light beam to any one of a plurality of output positions, and more particularly to light deflecting apparatus in which a light beam follows paths of equal optical length regardless of the point to which it might be deflected.

There is shown in a U.S. patent application by T. J. Harris et al., Ser. No. 285,832, filed June 5, 1963, a light beam deflection system using electro-optic techniques to digitally index the position of a beam of light. This system includes a number of deflection stages which may be made selectively operative to effect a directing of the light to any desired point. Each deflection stage includes a birefringent element through which a light beam passes over one or another of two paths as an ordinary ray or an extraordinary ray depending on its direction of polarization. When a light beam passes through the elements mainly as an ordinary ray, its optical path length is substantially greater than it would be if it passed mainly as an extraordinary ray. When a convergent beam of light is passed through the deflection system, the focal point of the beam varies in depth from the output of the system as the optical path length varies. It is normally desired that the light beam be focused to small output spots of uniform size lying in a common plane. This is possible only when the optical path lengths are equal regardless of the point to which the light beam might be deflected. When a collimated beam of light is passed through a limiting aperture at the input to the deflector, some diffraction of light takes place. If this aperture is to be imaged by a lens system at the output of the deflector for display purposes, it is necessary that the optical path length (distance between aperture and lens system) remain constant for all output positions.

In order to obtain a focusing of a convergent beam of light at different points in a common plane at the output side of a light deflector and to obtain correct imaging of light at such points when a beam of light is passed through a limiting aperture, it is necessary that the deflector be designed in such a manner that the optical path lengths are the same for every point to which the light might be deflected. This is accomplished in one form of the invention by providing at each stage of the deflector two identical birefringent elements which are oriented relative to each other in such a way that a linearly polarized light beam passes through one of them as the ordinary ray and through the second as the extraordinary ray. When the direction of polarization is rotated 90 degrees, the light beam passes through the crystals in opposite sequence. The orientations of the crystals are also such that the extraordinary rays pass through the crystals in different directions.

Another form of the invention accomplishes the same result by providing each stage of the deflector with two birefringent elements and a half wave plate located between them. One of the elements is rotated 180 degrees with respect to the ordinary ray passing through the other element. A light beam passing through the first element as the ordinary ray has its direction of polarization rotated so that it passes through the second element as the extraordinary ray. The reverse sequence takes place for the other polarization direction. The orientations of the elements are such that the two beams are deflected in opposite directions.

In still another form of the invention each stage of the deflector includes two elements, one of a positive birefringent material and the other of a negative birefringent material. With this arrangement each ray remains the same in each element but finds different optical path lengths.

An object of this invention is to provide an improved light deflecting apparatus.

Another object is to provide a light deflector in which the optical path lengths remain the same regardless of the paths over which the light might be directed.

Still another object is to provide a multistage light deflector in which each stage includes two birefringent elements, one of said elements passing a linearly polarized light beam as an ordinary ray and the other passing the same light beam as an extraordinary ray.

Yet another object is to provide an improved light deflecting apparatus including birefringent elements having a half wave plate between them and one of the elements being oriented at 180 degrees relative to the other.

Still another object is to provide a light deflector having elements of positive and negative birefringent material whereby both ordinary and extraordinary rays find paths of equal optical length.

The foregoing and other objects, features and advantages of the present invention will be apparent from the following more particular description of the preferred embodiments of the invention as illustrated in the accompanying drawings.

Figure 1:
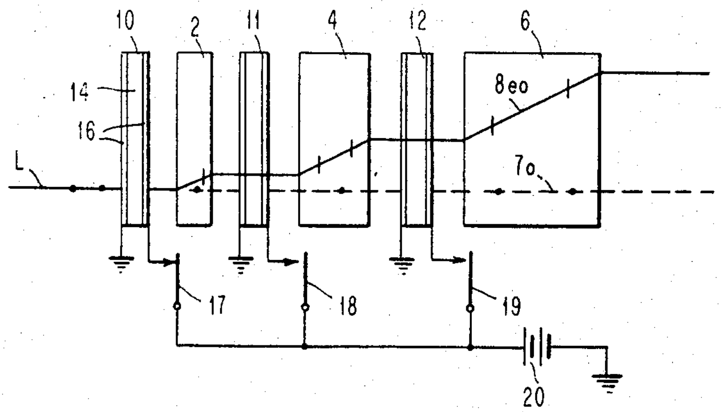
FIG. 1 PRIOR ART
FIG. 1 is a side elevational view of a digital light deflecting apparatus.

There is shown in FIG. 1 a digital light deflector like that described in the Harris et al. application mentioned above. This deflector includes birefrigent elements 2, 4 and 6, such as calcite crystals, through which a beam of light L passes without deflection as an ordinary ray 7*o* when linearly polarized in a plane perpendicular to the plane of the drawing. With the light polarized in a direction lying in the plane of the drawing it is deflected by the elements and passes through them as an extraordinary ray 8*eo*. At the input sides of the elements are electro-optic devices 10, 11 and 12 which normally have no effect on the light but which operate when energized to rotate its direction of polarization by 90 degrees. Each electro-optic device includes an electro-optic crystal 14 which may be a potassium dihydrogen phosphate crystal, and a transparent electrode 16 at each of its sides. One electrode of each electro-optic device is connected to ground and the other electrodes are connected through switches 17, 18, and 19 to one side of a voltage source 20 which is connected at its other side to ground. The light beam L is normally supplied to the deflector from any suitable source polarized in a direction perpendicular to the plane of the drawing so that it passes through without deflection if all of the switches are open. With switch 17 closed and the other open, as shown, maximum deflection is obtained since the light passes through each of the crystals as an extraordinary ray. The spacing between the ordinary and extraordinary rays at the output side of each crystal varies directly with its thickness. The thickness of the crystals, as shown in FIG. 1, increases from left to right by a factor of two so that an output of light may be obtained at the right hand end of the deflector at any one of eight positions by operating the switches 17, 18 and 19. It will be noted from FIG. 1 that the optical path length of the light varies depending on whether it passes through the crystals either mainly as an ordinary ray or mainly as an extraordinary ray.

Figure 2:
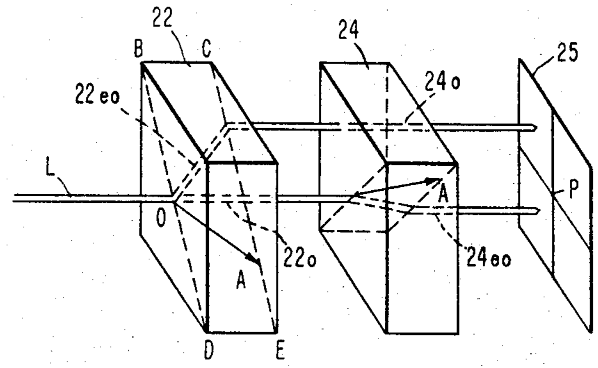
FIG. 2 is a perspective view of birefringent elements employed in each stage of a digital deflector in which the optical path lengths to different points on a viewing screen are equal.

The principal object of the present invention is to provide a light deflector similar to that described above but passing light rays having equal optical path length regardless of the amount of deflection. This is accomplished in one form of the invention by providing in place of each of the crystals 2, 4 and 6 a pair of crystals 22 and 24 as shown in FIG. 2. Crystal 22 is oriented so that its optic axis OA lies in the diagonal plane BCDE and extends downwardly as shown. Crystal 24 is oriented so its optic axis OA lies in a plane spaced angularly 90 degrees from the plane BCDE and extends upwardly in such plane. Due to these orientations, the extraordinary ray passes through crystal 22 upwardly in plane BCDE which is spaced angularly from a vertical plane by 45 degrees, and passes through crystal 24 downwardly in a plane spaced angularly 135 degrees from the vertical plane.

When a light beam L is directed to the crystal 22 polarized in a direction to pass straight through it as an ordinary ray 22*o*, the same ray passes through crystal 24 as an extraordinary ray 24*eo*. If the direction of polarization of the incoming light was rotated 90 degrees, then it would pass through the crystal 22 as the extraordinary ray 22*eo* and through crystal 24 as the ordinary ray 24*o*. At the output side of the crystal 24 is a screen 25 having its center P in alignment with the light beam L. With the light beam polarized in its original direction, the output light from crystal 24 would strike screen 25 at the center of its lower left quadrant. If the incoming light beam had its direction of polarization rotated 90 degrees, the light would be deflected in crystal 22 and pass straight through crystal 24 to the screen at the center of its upper left quadrant. With each of the crystals having a thickness equal to one half that of the corresponding crystal 2, 4 or 6 in FIG. 1, the vertical spacing between the two light paths at the output side would be slightly less than it would be at the output side of the corresponding crystal in FIG. 1.

Figure 3:
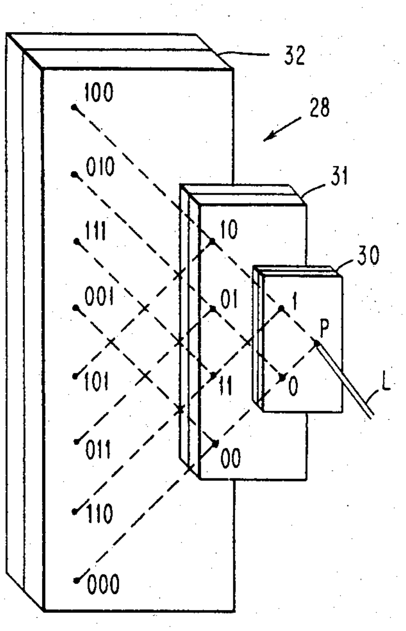
FIG. 3 is a perspective view of a light deflector similar to FIG. 1 but employing birefringent elements like those of FIG. 2 at each deflector stage.

A three stage deflector 28 similar to that of FIG. 1 but using a pair of crystals at each stage oriented in the manner of FIG. 2, is shown in FIG. 3. The light beam L is directed at the deflector in line with point P on the rst deflector stage 30. Although not shown in FIG. 3, an electro-optic device would be located at the input side of each deflector stage in the same manner as that shown in FIG. 1. It is assumed that the light beam L is linearly polarized in a plane perpendicular to the plane BCDE of FIG. 2. If all of the switches to the electro-optic devices are open, the light beam in deflected in the first stage 30 to point (0) and enters the second stage 31 opposite this point. Again the light beam is deflected downwardly and to the left in the second stage and leaves this stage at point (00). It then enters the third stage 32 opposite point (00) and is deflected to point (000). If only the electro-optic device at the input to the first stage 30 had been energized, the light beam would have been deflected upwardly to point (1) in stage 30 since it would pass through the first crystal of this stage as the extraordinary ray and the second crystal as the ordinary ray. The light beam remaining polarized in the direction to which it was rotated by the electro-optic device would be deflected upwardly in the second stage to point (10) and in the third stage to point (100). It will be appreciated that the designations for the points in FIG. 3 indicate the positions of the switches for the electro-optic devices (0) indicating an open switch and (1) a closed switch. The designations for the second and third stages indicate first the positions of the switches preceding it and then the position of the switch for that stage. It will be noted that the light output from the deflector will be at one of the eight points indicated depending on the positions of the switches.

Figures 4, 5:
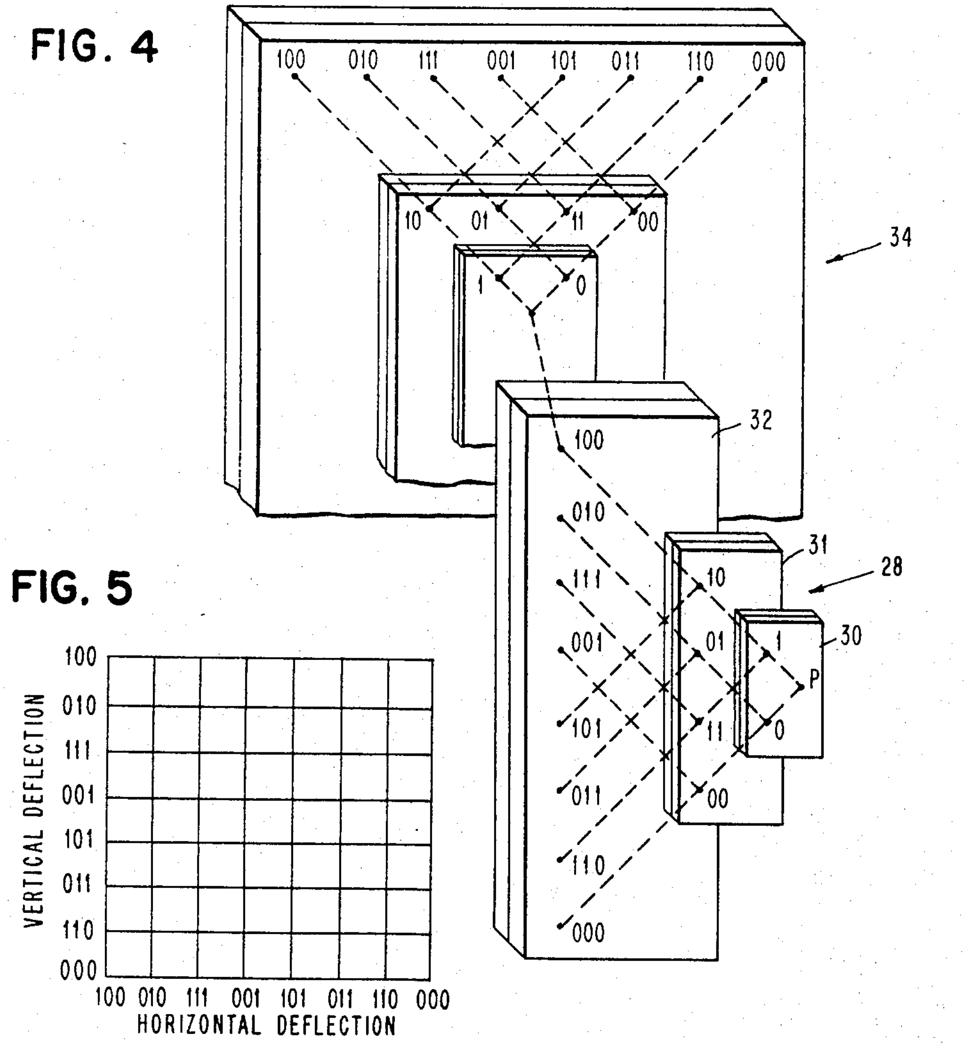
FIG. 4 is similar to FIG. 3 but includes apparatus for deflecting a light beam both vertically and horizontally.
FIG. 5 is a chart showing the points at which output light is received in the system of FIG. 4 for different switch settings.

FIG. 4 shows one deflector 28 like that of FIG. 3 for deflecting a light beam to any one of eight output points located in a vertical plane and a second deflector 34 for receiving light from any one of the eight vertical output points and deflecting it horizontally to any one of eight points. The deflector 34 is like deflector 28 except that its crystals are turned clockwise to positions at 90 degrees to those of deflector 28. It will be noted that the directions of deflection in deflector 34 are opposite those in deflector 28 since a light beam polarized in a direction to pass through a crystal in the latter deflector as an ordinary ray will pass through the corresponding crystal in deflector 34 as an extraordinary ray. There is shown in FIG. 5 a diagram indicating the settings of the switches in the horizontal and vertical deflectors to obtain a light output at any point lying at the intersections of the lines designating switch settings.

Figure 6:
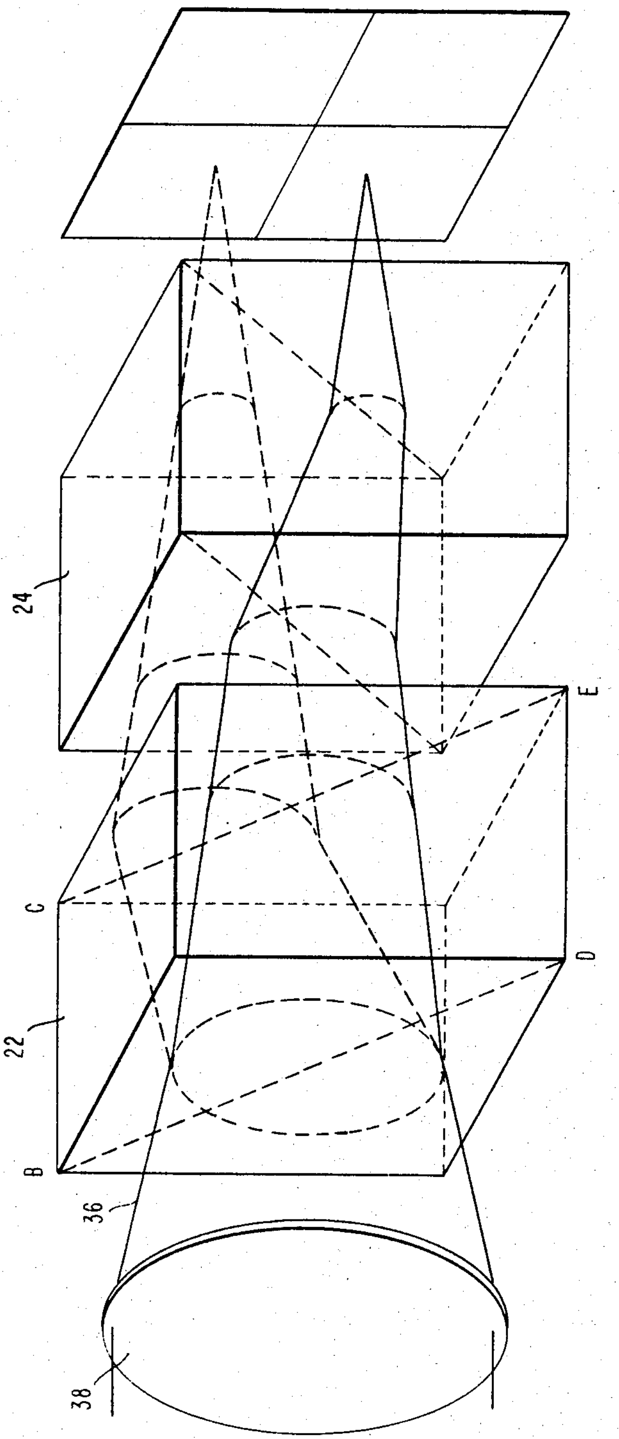
FIG. 6 shows a single stage deflector like FIG. 2 but having a converging light beam passing through it.

FIG. 6 shows a single stage deflector including a pair of crystals 22 and 24 oriented in the same manner as that of FIG. 2 but having a converging beam of light 36 directed through them from a lens 38. With the light polarized in a direction to pass through crystal 22 as an ordinary ray, it follows the path marked in heavy lines without deflection in crystal 22 and then is deflected downwardly in a diagonal plane of crystal 24 as an extraordinary ray. If the entering light beam has its direction of polarization rotated 90 degrees, it is deflected upwardly in the diagonal plane BCDE as an extraordinary ray in crystal 22 and then passes through crystal 24 without deflection as indicated by light broken lines. It will be noted that the output light is located at one or another of two points the same as in FIG. 2 and the optical path length is the same regardless of which point the light is deflected to.

Figure 7:
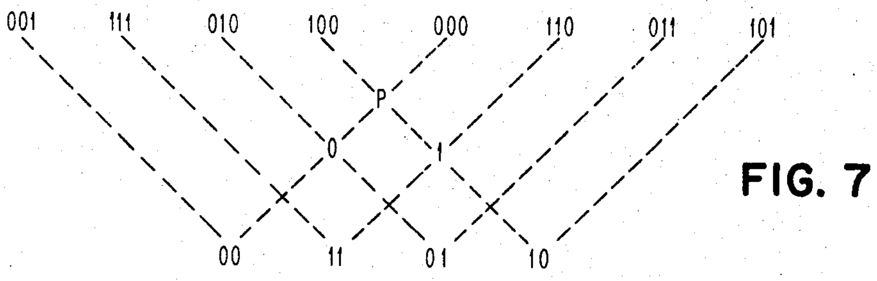
FIG. 7 shows points at which output light is received from a three stage horizontal deflector with the birefringent elements of the third stage rotated to positions 180 degrees from the orientations of the other two stages.

Instead of an orientation of crystals which produces a light deflection either continuously to the left from the original point P in the vertical deflector, as shown in FIGS. 3 and 4, or upwardly in the horizontal deflector as shown in FIG. 4, it is possible to rotate the crystals for any one or more stages by 180 degrees so the light deflection takes place in the opposite direction. There is shown in FIG. 7 the points at which output light appears at each stage of a horizontal deflector like that in FIG. 4 except that the crystals in the third deflector stage are rotated to positions 180 degrees from the positions of corresponding crystals in FIG. 4. The settings of the switches for the electro-optic devices are indicated at each point where an output of light may be obtained. It will be appreciated that the orientations of the crystals for the vertical deflector may be changed in a similar manner and that orientations as indicated by FIG. 7 makes it possible to obtain less displacement of the light from its original point of entrance into the device.

Figure 8:
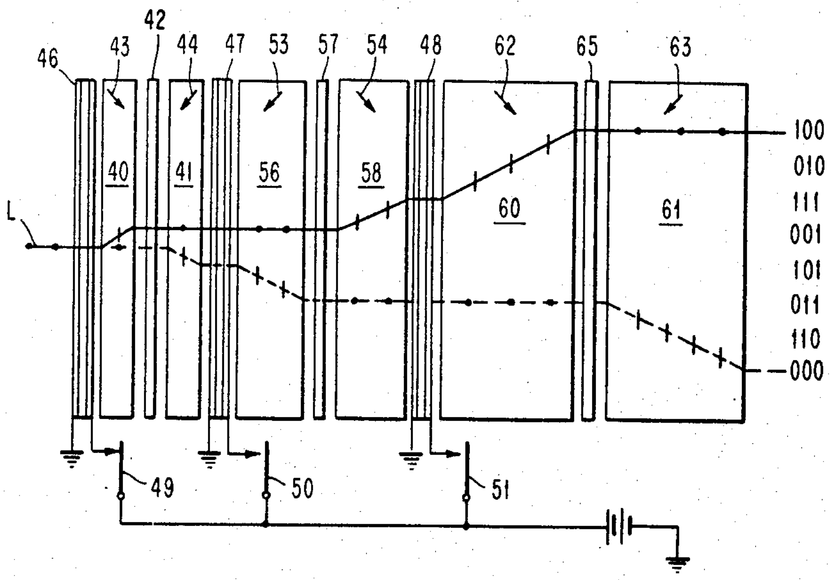
FIG. 8 is a side elevational view of a three stage deflector using a half wave plate between a pair of crystals in each stage.

Another form of the invention, making it possible to deflect light to any one of a number of points with the optical path lengths equal, is shown in FIG. 8. This is a three stage deflector similar to FIG. 1 but each stage includes a pair of birefringent crystals with a half wave plate between them. The first stage comprises crystals 40 and 41 with a half wave plate 42 located between them. The optic axis of crystal 40 is oriented in a direction, as indicated by arrow 43, to effect an upward deflection of an extraordinary ray in a vertical plane. This orientation is the same as that of the crystals in FIG. 1. The other crystal 41 is oriented, as indicated by arrow 44, in a direction to effect a deflection of the extraordinary ray downwardly in a vertical plane. If a light beam L enters the crystal 40 polarized in a direction perpendicular to the plane of the drawing, it passes through the latter without deflection. The half wave plate 42 then rotates the plane of polarization 90 degrees so the light passes through crystal 44 as an extraordinary ray and is deflected downwardly as shown. At the input sides of the crystals for the different deflector stages are electro-optic devices 46, 47 and 48 controlled by switches 49, 50 and 51. If the lowest point of deflection is to take place as it does in FIG. 1 when all of the switches are open, then the orientations of the crystals in the second stage must be opposite those of the first stage, as indicated by arrows 53 and 54. This is due to the fact that the direction of polarization for the light entering crystal 56 of the second stage is rotated 90 degrees from the direction of polarization for the light entering crystal 40 of the first stage due to half wave plate 42. With the light beam polarized in the plane of the drawing and the orientation of crystal 56 like that indicated by arrow 53, the light is deflected downwardly since it passes through this crystal as an extraordinary ray. Half wave plate 57 then rotates the plane of polarization 90 degrees and the light passes through crystal 58 without deflection as the ordinary ray. Crystals 60 and 61 of the third stage are oriented in the same directions as those of the first stage as indicated by arrows 62 and 63 so the light continues to pass through crystal 60 as an ordinary ray but passes through crystal 61, after rotation of its direction of polarization by half wave plate 65, as an extraordinary ray.

In the foregoing, the direction of deflection in the birefringent crystals was noted to be opposite to the direction of the optic axis with respect to the normal on the crystal. This is, therefore, a negative birefringent material, such as calcite. It is understood, however, that positive birefringent crystals can also be used, where the extraordinary beam is deflected in a direction in the same sense to the normal as the optic axis.

If the switch 49 for the electro-optic device 46 is closed and the switches for the other stages are open as shown in FIG. 8, the light passes through crystals 40, 58 and 60 as an extraordinary ray and is deflected upwardly but passes through crystals 41, 56 and 61 without deflection. This switch setting results in maximum light deflection. Deflection of light to other points between the two extremes is obtained with the switch settings indicated along the right hand side of FIG. 8. With each crystal of each stage being one half as thick as the crystal of the corresponding stage in FIG. 1, the same amount of spacing between the light output points is obtained. Regardless of which point the light is directed to, the optical path length is the same.

Figure 9:
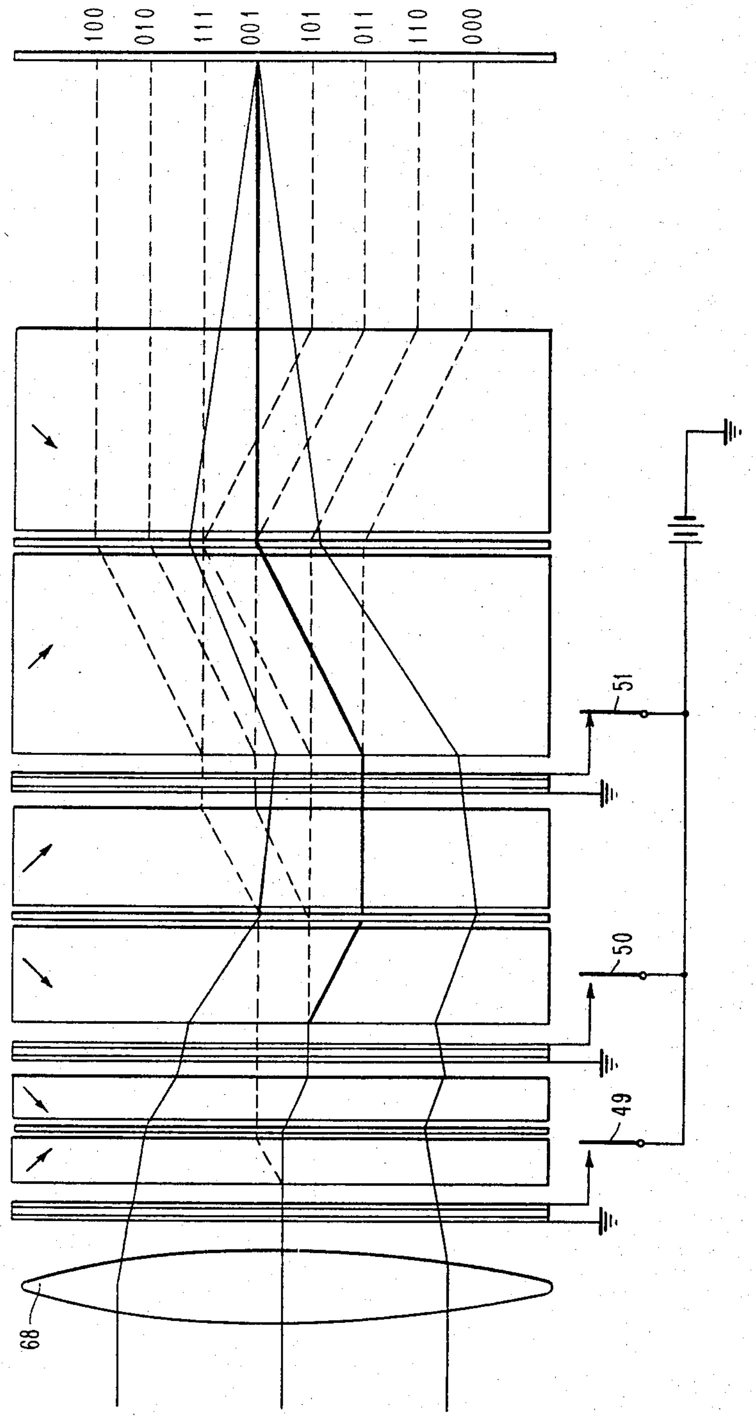
FIG. 9 is an elevational view of a deflector like that of FIG. 8 but is shown passing a converging light beam.

FIG. 9 shows a deflector like that of FIG. 8 but having a converging beam of light passing through it from a lens 68. In this case the path of the light beam is shown in solid lines with the switch 51 to the electro-optic device of the third stage closed and the other switches open. It will be appreciated that the orientations of crystals different from those indicated may be employed if a different order of light output is desired for the various switch settings. It is only essential that the optic axis of one crystal in each stage be at 90 degrees to the optic axis of the other crystal in the same stage.

Figure 10:
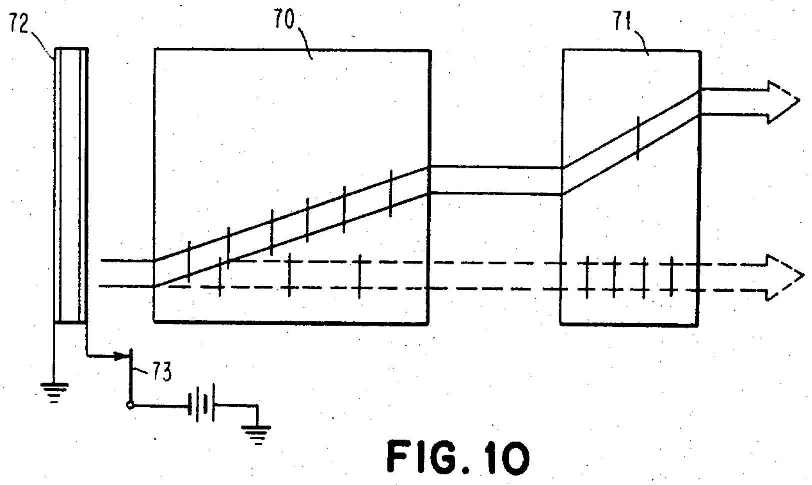
FIG. 10 is a side elevational view of a single stage deflector having elements of positive and negative birefringent material.

Still another form of the invention is shown in FIG. 10 in which a single stage of a deflector includes two elements 70 and 71 made of positive and negative birefringent material, respectively. The ordinary and extraordinary rays remain the same in both elements but the extraordinary rays finds in the positive birefringent material an optical path length longer than that for the ordinary ray. The reverse is true for the negative birefringent material. Examples of material suited for this method of operation are urea as the positive birefringent material and calcite as the negative birefringent material. As an indication of the optical path length of the two rays in FIG. 10, divisions have been made showing that the extraordinary ray has seven length units in element 70 and only two in element 71. The ordinary ray finds four units of path lengths in element 70 and five units in element 71. It will be noted that the total of the units for the two rays are equal. An electro-optic device 72 is located at the input side of the element 70 and is effective to rotate the plane of polarization of light passing therethrough by 90 degrees when switch 73 is closed. A plurality of such stages may be employed in a light deflector as shown in FIG. 8.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A digital light deflector for interposition between a source of a beam of plane polarized light and a target to deflect the beam to a selected position in the target comprising, in combination, a plurality of aligned cascaded light deflection stages, each of said stages having in the order of the incoming beam of light, means for selectively rotating the beam of light transmitted therethrough into one of two mutually orthogonal planes, and birefringent means for transmitting the beam of light along one of two different paths dependent on the plane of polarization of the light, each of said birefringent means having two serially arranged elements, each element presenting a different optical path length to the beams in the two mutually orthogonal planes with the path length sums for the two beams through the two elements being substantially equal.

2. The deflector of claim 1 in which the optic axes of said birefringent elements in each stage are directionally oriented oppositely to each other in such a manner that a beam of light linearly polarized in one plane passes straight through one of said elements as an ordinary ray and is deflected in the other of said elements as an extraordinary ray while a beam of light polarized in a plane at 90 degrees to said first plane passes through said elements in opposite sequence with the direction of deflection of said second beam being different from the direction of deflection of said first beam.

3. A digital light deflector for interposition between a source of a beam of plane polarized light and a target to deflect the beam to a selected position in the target comprising, in combination, a plurality of aligned cascaded light deflector stages, some of said stages being oriented to deflect the beam in a first plane and the remainder of said stages being oriented to deflect the beam in a second plane, each of said stages having in the order of the incoming beam of light, means for selectively rotating the beam of light transmitted therethrough into one of two mutually orthogonal planes, and birefringent means for transmitting the beam of light along one of two different paths dependent on the plane of polarization of the light, each of said birefringent means having two serially aring a different optical path length to the beams in the two mutually orthogonal planes thereby providing path length sums for the two beams through the two elements of each stage that are substantially equal.

4. A digital light deflector for interposition between a source of a beam of plane polarized light and a target to deflect the beam to a selected position in the target comprising, in combination, a plurality of aligned cascaded light deflection stages, each of said stages including in the order of the incoming beam of light means for selectively rotating the beam of light transmitted therethrough into one of two mutually orthogonal planes, and a pair of birefringent elements arranged along the same axis to accept the beam as provided in one of the two orthogonal planes and to transmit it along one of two different paths dependent on the plane of polarization, the elements being oriented relative to each other in such a manner that their optic axes are oriented in different directions in the same plane, and a half wave plate located between said birefringent elements in each of said stages arranged to rotate the plane of polarization of a beam in passing from one element to the other, such that the optical path lengths through the stages are equal for every position to which the beam might be deflected in the target.

5. The deflector of claim 4 in which a birefrigent element of any one of said stages is equal in thickness to the other birefrigent element of the same stage.

6. A digital light deflector for interposition between a source of a beam of plane polarized light and a target to deflect the beam to a selected position in the target comprising, in combination, a plurality of aligned cascaded light deflector stages, each of said stages including in the order of the incoming beam of light means for selectively rotating the beam of light transmitted therethrough into one of two mutually orthogonal planes, and a pair of birefrigent elements for accepting the beams as provided in one of the orthogonal planes and for transmitting it along one of two different paths dependent on the plane of polarization, one of said elements being made of a positive birefringent material and the other being made of a negative birefringent material such that each element presents a different optical path length to the beams in the two planes with the path length sums for the two beams being substantially equal.

7. A digital light deflector for accessing a target with a light beam comprising, a source of converging plane polarizing light for providing the beam, a plurality of aligned cascaded light deflection stages, each of said stages having in the order of the incoming beam of light, means for selectively rotating the beam of light transmitted therethrough into one of two mutually orthogonal planes, and birefringent means for transmitting the beam of light along one of two different paths dependent on the plane of polarization of the light, each of said birefiringent means having two serially arranged elements, each element presenting a different optical path length to the beams in the two mutually orthogonal planes with the path length sums for the two beams through the two elements being substantially equal.

8. A light deflector for interposition between a source of a beam of plane polarized light and a target to deflect the beam to a selected position in the target, comprising means arranged in the path of the incoming beam of light for selectively rotating the beam into one of two mutually orthogonal planes, and birefringent means aligned with the rotating means to accept the beam as provided in one of the orthogonal planes and to transmit it along one of two different paths dependent on the plane of polarization, the birefringent means including two serially arranged elements, each element presenting a different optical path length to the beams in the two planes with the path length sums for the two beams through the two elements being substantially equal.

9. The deflector of claim 8, wherein one of the birefringent elements is made of a positive birefringent material and the other element is made of a negative birefringent material.

10. The deflector of claim 8, wherein the birefringent elements are oriented relative to each other in such a manner that their optic axes are oriented in different directions in the same plane, and wherein the deflector further comprises, a half wave plate located between the birefringent element.

References Cited

Tabor: Bell System Technical Journal, vol. 43, May 1964, pages 1153–1154.

DAVID H. RUBIN, *Primary Examiner.*

R. J. STERN, *Assistant Examiner.*

UNITED STATES PATENT OFFICE

CERTIFICATE OF CORRECTION

Patent No. 3,391,972 July 9, 1968

Thomas J. Harris et al.

It is certified that error appears in the above identified patent and that said Letters Patent are hereby corrected as shown below:

Column 7, line 17, after "in" insert -- ranged birefringent elements, each element present --.

Signed and sealed this 10th day of February 1970.

(SEAL)
Attest:

Edward M. Fletcher, Jr.
Attesting Officer

WILLIAM E. SCHUYLER, JR.
Commissioner of Patents